Nov. 6, 1962      F. PAPKE      3,062,086
BLOCK TYPE ALBADA VIEWFINDER
Filed Jan. 27, 1958
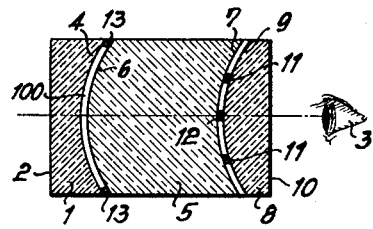
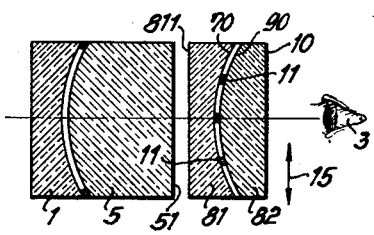
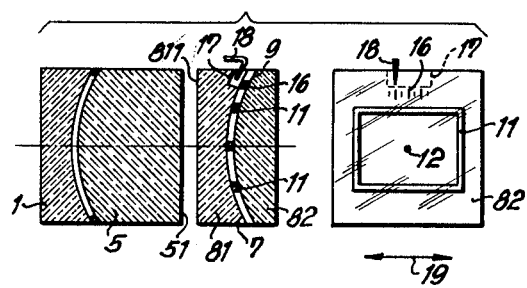
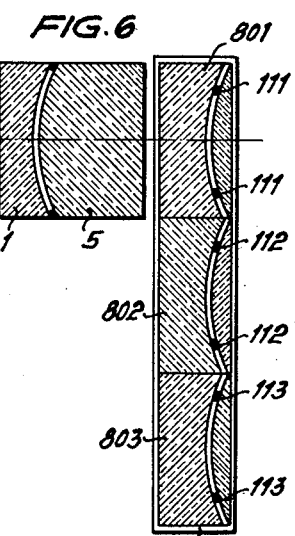
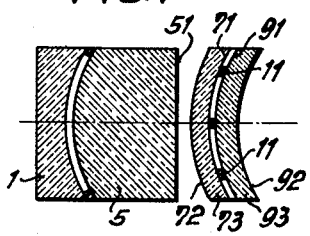
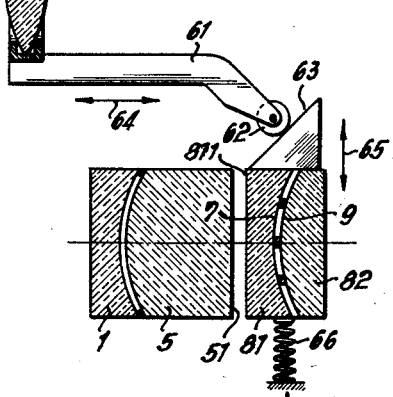
INVENTOR
FRIEDRICH P. APKE
BY
ATTORNEYS

United States Patent Office 3,062,086
Patented Nov. 6, 1962

3,062,086
BLOCK TYPE ALBADA VIEWFINDER
Friedrich Papke, Braunschweig, Germany, assignor to Voigtländer A.G., Braunschweig, Germany, a corporation of Germany
Filed Jan. 27, 1958, Ser. No. 711,250
Claims priority, application Germany Jan. 31, 1957
18 Claims. (Cl. 88—1.5)

This invention relates to photographic view-finders and it has particular relation to view-finders of this type in which a frame limiting the image field is reflected into the field of the finder.

It has been known that, in order to fully utilize the size of the available image area, it is of advantage to indicate the exact limit of the photographic image in the view-finder. This is particularly desirable in miniature cameras used in taking color pictures. The higher the magnifying proportion of the view-finder is selected, the more important it is to have a framing of the image field in order to avoid dependence on whether the operator looks exactly centrally or in a somewhat inclined direction through the finder.

Numerous suggestions have been made for providing view-finders with such frames. For example, a frame is reflected into the finder field, and exactly reproduces the available image area of the corresponding camera objective. Thereby, reflection of the frame can be brought about according to two different principles. One of these principles is that of lateral reflection in which the frame to be reflected and imaged is located laterally of the finder. According to a second principle the frame to be reflected is arranged in the path of rays passing through the finder. This second principle is used, for example, in the so-called "Albada"-finder. The present invention relates to a finder which belongs to this last-mentioned type, in which a partially permeable concave mirror images a frame practically at infinity, the frame being arrange between the viewing eye and the partially permeable mirror at about the focal plane of the mirror.

Such an Albada-finder is distinguished by simple construction, but the brightness and/or contrast of the frame relative to the surroundings has not been satisfactory in the known constructions so that the finder has found only limited application. The reason is that the frame of the finder is illuminated through the partially permeable mirror so that only a fraction of the available light is effective in illuminating the frame. From this fraction again a considerable portion of the light will be lost, because the partially permeable mirror reflects, of course, only part of the light radiated from the frame and thereby utilizes only a fraction thereof.

Various attempts have been made previously in order to improve the brightness or contrast of the reflected frame of the Albada-finder. For example, it has been suggested to substitute, for the partially permeable mirror, a fully reflecting mirror in such a manner that the reflection of the frame should take place from the edge of the image field of the finder. In such an arrangement the light, which illuminates the frame, can pass uninterruptedly through the non-mirrored parts of the finder and is then imaged by the fully mirrored part. This arrangement has the disadvantage that it is based on a division of the pupil and, therefore, requires a very exactly defined position of the eye or the pupil, which cannot be attained without difficulty in using the finder. According to another suggestion, the partially permeable mirror is retained in the finder, but the light for illuminating the frame is introduced in such a manner that it does not need to pass through the partially permeable mirror and, therefore, can be used, without being weakened, for illuminating the frame. However, this type of illuminating the frame by means of so-called light directors requires a relatively complicated structure and correspondingly increases the expenses for the finder. According to other suggestions, filters, color filters, polarizing filters or luminescent compositions are used in order to increase the contrast of the frame relative to the surroundings. The use of these suggestions likewise results in complications which do not have the desired results and are expensive.

The main object of the present invention is to provide a finder of the above described Albada-type, in which simple means are used in order to obtain an image field frame rich in contrast and brightness of the finder image, and which approximates as much as possible the natural brightness.

This object is attained according to the present invention by a particular design of the frame to be reflected, in combination with a highly reflective, partially permeable mirror which is as much as possible free from absorption and by largely eliminating reflections and losses of light.

It should be mentioned that the conventional, partially permeable spherical concave mirror has normally a refractive power of zero for light rays passing through it. The conventional form of the frame-carrier is a plane surface which is perpendicular to the optical axis. The use of such structure is conventional in known types of view-finders and it is substantially satisfactory in some cases, for example at decidedly small image angles. However, this structure has the pecularity—which is noticeable already at medium size image angles and particularly at larger image angles—that the light used for illuminating the frame comes from a direction which is entirely different from the direction of viewing, and in which the frame reflected into the field of the finder can be seen. This is, as a rule, a disadvantage if the frame receives its light from a relatively dark zone and its reflected image appears in combination with a relatively bright zone of the finder field. In such a case the image of the poorly illuminated frame will appear pale in comparison with the bright background and can be recognized only with difficulty or not at all.

According to the present invention this difficulty is eliminated by the use of a frame-carrying surface which—in contrast to the known finders—is not plane and has a form which is convex toward the object to a predetermined extent, i.e. for a predetermined effect.

In a previously known Albada-finder, which has the form of a Newton finder, the frame is applied to the outer surface of the eye lens, which surface is convex toward the object. In this form of the finder, the frame to be imaged cannot obtain illumination from the same zone of the image space in which the image of the frame appears. Therefore, this known construction has the disadvantage that the frame will not be sufficiently rich in contrast in comparison with bright portions of the image field, for example, in comparison with the sky. This will have troublesome effects particularly in cases in which the zones, from which the frame obtains its illumination in conformity with the optical and geometrical conditions of its structure, primarily contain dark portions. In order to render such finders practicable also under unfavorable conditions of illumination, it has been attempted to use diffusely reflecting frames or to replace the image forming partially permeable mirror by fully reflective zones, on a part of its surface. Thereby a division of the pupil is brought about and this represents a disadvantage. The use of a fully reflecting frame mirror instead of a mirror which is partially permeable throughout, excludes the possibility of obtaining, for the frame to be reflected, sufficient illumination from that zone which is observed, because this zone is covered—at least in part—by the fully reflecting frame mirror.

In contrast to the above described previous suggestions, it is contemplated according to the present invention to apply the frame to be reflected to a curved surface in such a manner that the frame is located within the solid angle of the light rays passing through the finder, whereby the curvature of the carrier surface has to be selected in such a manner that the light serving for illumination of the frame is derived from that zone of the image field, into which the frame is reflected, and at the distance of the eye on the optical axis in a regular use of the finder.

In carrying out this fundamental arrangement, the frame is located preferably within the solid angle of the path of rays through the finder. Reflections on mounting parts of the finder, which would adversely affect contrasts, can be avoided by the additional step of making the frame distinctly smaller than the eyepiece opening of the finder. In addition, it is thereby attained that the distance of the eye from the eyepiece opening of the finder is increased, so that such a finder embodying the present invention can be used directly also by persons who wear glasses.

According to a preferred embodiment of the invention, the frame carrier has a spherical surface convex in the direction of the object to be observed. Thereby, the curvature is preferably selected in such a manner that its radius is equal to, or smaller than, ½ of the radius of the above-mentioned partially permeable concave mirror which produces the image of the frame. By this arrangement, in a certain sense, light which is supposed to serve for illumination of the frame is derived from the range at which the operator looks. In comparison with Albada-finders known previously, according to the invention a considerable elucidation of the image of the frame is obtained under unfavorable light conditions. In some cases, the spherical curvature can be substituted by a cylindrical curvature.

The above-mentioned partially permeable concave mirror, which acts as a beam splitter, is prepared for the purposes of the present invention in a manner known by itself by deposition of the reflecting material by vaporizing under high vacuum, or by suitable chemical treatment. The partially permeable metallic layers known from the prior art of reflection technics, absorb a considerable portion of the light. On the dividing surface of the concave mirror, this loss by absorption amounts to as high as 35% or more. In order to improve the yield of light of the partially permeable mirror provided with partially permeable metallic layers, it is contemplated according to the present invention to form the mirror proper from two parts. Thereby, in the direction of light a plano-concave light permeable member is followed by an air lens, which is joined by a light-permeable plano-convex member. The resulting effects are particularly favorable if the limiting surfaces of the two members which enclose the beforementioned air lens are highly refractive and have a refractive index for glass of at least $n_d = 1.5$. In the use of members made of organic synthetic material, a refractive index higher than $n_d = 1.45$ would be sufficient.

A structural form of the finder, which is particularly favorable with regard to dimensions and manufacture, is obtained according to the present invention if the finder is made of three members, whereby, in the direction of light, a front member which has a concave limiting surface toward the eye, is followed by a glass block having two limiting surfaces curved in the same sense as the concave surface of the front member, and this glass block is in turn followed by a rear member having a convex surface which forms the carrier surface for the frame to be reflected and is located adjacent the glass block. The beforementioned three members can be independent and held in one mounting member holding them, or said members can be joined pair-wise in accordance with particular requirements. For example, a front member which is provided with a beam splitting mirror, can be united with a glass block arranged in the center of the finder, whereby the rear member which carries the frame would remain independent. Or the front member can be arranged by itself and the glass block can be combined with the rear member to form a structural unit. Combination of all three members to form a single structural unit has been found to be of particular advantage. According to a specific embodiment of such three-membered finders, the front lens is a plano-concave lens which forms, with the convex-concave glass block an intermediate air lens, while a plano-convex lens which forms the rear member has its convex surface, carrying the frame, cemented to the glass block. Thus, this finder is limited by two plane parallel surfaces which have no magnifying optical effect. On the other hand, in this structural form the frame, as well as the partially permeable mirror, are protected from outside influences by enclosure between glass surfaces. Furthermore, cementing of the frame-carrying member to the glass block prevents troubling reflections. However, such cementing can be dispensed with, if desired. Furthermore, in similar arrangements, the mirror or the plano-convex lens, the convex surface of which is rendered partially permeably reflecting, can also be cemented to the glass block. However, thereby reflection of this mirror is reduced and its permeability increases. If the above mentioned particularly good relation within the problem of the present invention is supposed to be restored, the layer applied by deposition by vaporizing should be rendered thicker, which would result in a further increase of absorption. The beforementioned possibility of arranging, in accordance with the present invention, an air lens between the front member and the glass block, serves for the elimination of these difficulties. Thereby, it is sufficient to arrange a very small air gap which should have only such a thickness that it is capable to largely prevent the formation of interference phenomena, e.g. Newton's rings. The two surfaces enclosing this air gap should be preferably parallel. The air gap renders it possible to fully retain the originally present reflection of the concave mirror, and to this effect the reflection on the glass-air-surface—which is parallel to said mirror—of the beforementioned block-like middle part of the finder is added, so that reflection is increased. From this it follows that, in this structural form, at equal total reflection the partially permeable metallic layer can be kept thinner. The optical yield of the finder is thus improved.

According to a particularly advantageous embodiment of the invention, both parts i.e. the concave mirror which acts as a beam splitter, as well as the frame to be reflected, are produced by deposition by vaporization of suitable reflecting substances, preferably under high vacuum. This procedure results in obtaining particularly favorable conditions with regard to the partially permeable layer on the one hand, and the reflection of the frame material deposited by vaporizing, on the other hand.

As materials to be deposited by vaporizing in the production of the frame, fundamentally all those highly reflecting, non-absorbing metals can be used which are utilized in conventional manner in the manufacture of mirrors, e.g. silver, aluminum, and gold. The high reflecting power of these metals is particularly well utilized due to the fact that the frame is deposited, according to known optical manufacturing procedures, on a polished surface.

A favorable yield of light in the optical meaning could be obtained in a finder, the partially permeable mirror of which permits passage of 50% of the light and reflects 50% of the light. However, such loss-free beam splitters are normally obtainable by interference layers only, and interference layers have mostly the disadvantage that they are selective, i.e. they permit passage of a part of the spectral range of the light and reflect the other part. They function, for example, to transmit red light and to reflect green light, or to transmit yellow light and to reflect blue light, etc. They do not reflect again light which they have permitted to pass once, or reflect it only weakly. Due to this, losses of brightness would occur in the reflection of the frame so that selective interference beam splitters are not suitable for use in carrying out the present invention. However, multiple layers, the effect of which is based on interference, but show only a slight color tinge in reflection and permeability, yield rather satisfactory results. Therefore, the use of such multiple layers for the reflection of the frame represents a favorable embodiment of the present invention.

On the other hand it is also possible to develop the normal simple layers for applying them to the present invention in a very favorable manner.

According to a further embodiment of the invention, it is contemplated to render both surfaces in question, i.e. the concave surface of the first glass member and the convex surface of the second glass member, partially permeably reflecting. This embodiment offers, among other advantages, the possibility of using non-absorbing substances, the reflection at one surface of which does not exceed 30%, as a rule. In order to nevertheless obtain sufficient contrast between the reflected frame and its surroundings, the second of the beforementioned surfaces is treated with the same non-absorbing substances in a similar manner by deposition by vaporization. The reflections of these two layers are added to each other in a manner known by itself, and a beam splitter with negligible absorption—which amounts to a few percent only—is obtained.

One or both of the surfaces limiting the air lens are provided, according to a further embodiment of the invention, with a layer, or a combination of layers, for increasing reflection. If both of said surfaces are provided with such additional layers, the additional layer turned toward the incidence of light can be rendered more strongly reflecting than the other surface.

In order to reduce reflections which may have undesired effects in using the finder according to the present invention, it is preferred to reduce reflection of the eye facing plane surface of the last lens of the finder. It has been found to be of advantage to provide also the object facing plane surface of the front lens, with a layer for reducing reflection, for the same purpose.

The frame to be reflected can consist of a closed line, or—in a manner known by itself—also, in interrupted lines. Furthermore, in carrying out the invention it is possible to arrange, in addition to the frame calculated for infinite distance, additional cross-pieces, or frame parts which correspond at one or more near distances to the parallax compensation.

Adjustment of the image frame to the image angles of different size, of exchangeable objectives inserted in the camera, can be taken into consideration and compensated for in such a manner that, as the frame carrier, a member is arranged which contains several frames for the different image sizes, for example for objectives having normal focal length, tele-objectives and wide-angle objectives, these frames being arranged in the member locally separated from each other. This frame carrier is displaceably arranged and a frame which corresponds in each case to the special objective used is brought in in front of the eye opening of the finder for the respective picture to be taken. Such a carrying member can be in the form of a slide, revolving member or the like.

The frame carrier can be arranged, in a manner known by itself, displaceably in the meaning of parallax compensation, whereby its movement can be effected by a lever, slide, or rotary button. The beforementioned member which carries the various frames, is, like the above described carrier member, made of light-permeable material having the refractive power zero. It is advisable to reduce the reflection of its surface turned toward the eye. It is likewise advisable to provide its surface turned away from the eye with a layer protecting from reflection. If this rear member is displaceably arranged for parallax compensation, its adjustment can be brought about in a manner known by itself by means of a scale which is displaceable relative to a stationary mark. Or the mark can be arranged on the frame carrier displaceably relative to a stationary scale arranged on the finder casing. According to an advantageous embodiment, a reflecting scale is arranged on the frame carrying surface, preferably by deposition by vaporizing. The lens of the frame carrier which covers the frame is provided on its edge, for example, with a recess, into which a non-displaceable mark, which is stationary in the camera casing, projects. Upon looking through the finder in such a construction, or, a similarly acting device, the reading can be done and the displacement can be effected in a simultaneous observation without the necessity of removing the finder from the eye.

According to a further embodiment, for the purpose of parallax compensation it is contemplated, according to the invention to couple the above mentioned displacements of the frame-carrying member by means of transmission members (of the type conventional in photographic cameras) with the adjustment of the picture-taking objective. If the finder is constructed in such a manner that it forms a unit having a common eye opening with a base range finder, then the beforementioned displacement of the member carrying the frame to be reflected can be coupled with the adjustment of the range finder. In such cases it is of advantage to use the scale arranged in the interior of the finder simultaneously for reading the distance adjusted by the range finder. If the frame carrier is stationary, it is possible—for the purpose of parallax compensation—to displaceably arrange the front member of the finder, or the block carrying this member.

As already mentioned above, the frame carrying member consists of a light-permeable material having the refractive power zero. It is possible to use instead of a plano-concave carrying member, an arched glass cup produced, for example, by blowing or curving. This may mean a further reduction in the manufacturing expenses of this member of the finder according to this invention. The frame is deposited on this cup by vaporizing. Such cups have practically likewise a refraction power of zero. It is also possible to use two cups cemented with each other and arrange the frame in the cemented interface of said cups. In this manner the frame will be in a protected position.

The appended drawings diagrammatically illustrate some specific embodiments of and best modes for carrying out the invention and serve to further disclose the invention which, however, is not limited to said embodiments. In the various figures, identical parts are denoted by identical reference symbols. It will be appreciated that in addition to the structural forms shown in the drawings other structural forms can also be used in carrying out the invention.

In the drawings:

FIG. 1 is an axial sectional view through a preferred form of viewfinder embodying the invention;

FIG. 2 is an axial sectional view through a viewfinder embodying the invention, and in which the frame carrier is separate from the remainder of the viewfinder body;

FIG. 3 is an axial sectional view and an eye end view of a viewfinder embodying the invention and incorporating means for indicating parallax compensation;

FIG. 4 is an axial sectional view through a viewfinder similar to that shown in FIG. 2 and illustrating coupling of the parallax compensation with displacement of the camera objective;

FIG. 5 is an axial sectional view through an embodiment of a viewfinder in accordance with the invention, as combined with a base range finder;

FIG. 6 is an axial sectional view through a viewfinder embodying the invention and illustrating the use of different size frames; and FIG. 7 is an axial sectional view through a viewfinder embodying the invention and illustrating a modified form of frame carrier.

Referring to FIG. 1, the Albada block type viewfinder shown therein includes a front lens 1 having a plane surface 2 facing the object and a spherically concave surface 4 facing the observer's eye 3. The viewfinder includes an intermediate transparent block 5 having a convex surface facing the object and which has a curvature registering with that of the surface 4 of lens 1. A narrow air lens 100 is defined by the surfaces 4 and 6. The eye facing surface of member 5 is concave. Glass block 5 is followed by a lens 8 which has a convex surface 9 cemented to block 5 and a plane surface 10 which is parallel with plane surface 2.

On the cemented surface 9 of glass member 8 the frame 11 to be reflected is produced by deposition by vaporizing. Furthermore, in order to indicate the center of the finder image, on the surface 9, a mark 12 is additionally provided, this mark being preferably likewise produced by deposition by vaporizing. The curved surfaces 4 and 6 are arranged at a small distance 100 from each other, but are connected with each other, for example, by means of small cementing cushions 13 or by a corresponding cementing ring arranged on the edge. The beam splitting layer can be applied to one of the surfaces 4 or 6 or to both surfaces 4 and 6. In using highly reflecting glasses, for certain purposes the application of a particular reflecting layer can be dispensed with, whereby their function is taken over by the glass surfaces proper.

It is of advantage to select the materials of the frame and the beam splitter, deposited by vaporizing, with regard to their color. It has been found that the combinations: beam splitter consisting of a gold-copper-alloy combined with a frame consisting of gold or copper; or the combination of a beam splitter consisting of zinc sulfide with a frame consisting of silver or aluminum; or the combination of a beam splitter consisting of antimony-sulfide with a frame consisting of gold or copper, yield particularly advantageous contrast conditions.

FIG. 2 diagrammatically illustrates a finder which has the beforementioned features of the invention, and contains additional means for compensation of parallax. In order to attain this, the lens 8 which is shown in FIG. 1 as the rear member of a device consisting of a unitary finder block, is separated from such block and can be displaced relative thereto. Thereby, the first two members, consisting of parts 1 and 5, form the residual block as shown in FIG. 2. Moreover, rear member 8 is subdivided into two lens-shaped parts 81 and 82. These two lenses have their surfaces 70 and 90 cemented together, and these surfaces are convex in the direction of the object to be viewed and carry the frame 11, which is deposited by vaporizing on the interface. The lens 81 has a plane surface 811 on the object side. Plane surface 811 is separated by an air layer of small thickness from plane surface 51 of glass block 5 and these surfaces 811 and 51 are not cemented together. The aggregate 81, 82 can be displaced, due to the presence of the air gap between surfaces 51 and 811, in the direction of arrow 15, so that compensation for parallax can be obtained in a manner known by itself. In using the device shown in FIG. 2, a scale and mark can be used in conventional manner, but this is not shown in FIG. 2.

FIG. 3 indicates the manner in which the degree of parallax adjustment can be rendered visible in the finder. A scale 16 is deposited by vaporizing on the surface which carries frame 11. Lens 81 is provided with a recess 17, into which a pointer-shaped mark 18, fastened to the casing of the finder or of the camera, projects. Recess 17 is formed in such a manner that it does not prevent the passage of light rays. In order to attain this, recess 17 is preferably arranged—as shown in this embodiment—outside the solid angle of the path of light rays through the finder. If the member 81, 82 is displaced in the direction of arrow 19, scale 16 will be displaced relative to the stationary pointer 18. This is observed by the operator looking through the finder, so that the parallax can be eliminated without the necessity of moving the camera away from the eye. It is, of course, also possible to arrange the scale as a stationary member in the casing and to apply the mark on the displaceable frame carrier.

FIG. 4 illustrates one of numerous arrangements for coupling displacement of the objective with parallax compensation. Reference numeral 60 denotes the objective of the camera, to which is connected a lever 61 carrying a roller 62 engaging a cam 63 fastened to frame carrier 81, 82 of the finder. If the objective is displaced in the direction of the arrow 64, frame carrier 81, 82 will positively be caused to move in the direction of arrow 65. Of the additional conventional mechanical elements which are necessary in this connection, e.g. means for straight line guiding for the frame carrier, spring means etc., for the sake of clearness only a spring 66 is shown in the drawing.

FIG. 5 diagrammatically illustrates, by way of example, the use of a finder according to the present invention in combination with a base range finder having a common eye opening, and with simultaneous elimination of parallax. Reference numeral 40 denotes a partially permeable mirror which is cemented at the block 5 divided at 511 in an angle of 45° relative to the optical axis. Reference numeral 41 denotes the measuring ray which is reflected by mirror 42 into the path of rays of the finder. Mirror 42 can be turned about pivot 43, and carries a lever 44 provided with a cam 45. A contact lever 46 is fastened to member 81, 82, which carries frame 11 and lever 46 slides by positive engagement along cam 45, whereby the swinging movement of mirror 42 is converted into a rectilinear movement of parts 81, 82 in the direction of arrow 47. The compensation for parallax takes place otherwise in the same manner as described in FIG. 2. If scale 16 shown in FIG. 3 has divisions in meters, it is possible to read the adjusted distance directly in the finder.

FIG. 6 illustrates a further embodiment of the displaceable rear member. The frame carrier is here provided with various rear members 801, 802, 803, which respectively carry frames 111, 112, 113, of different sizes for different image sections, corresponding to the focal lengths of the exchangeable objectives to be inserted in the cameras. In the embodiment shown in FIG. 6, these rear members are arranged on a displaceable rod 88 vertically one above the other.

FIG. 7 illustrates an embodiment of the invention, in which the composite component carrying the frame 11 has, instead of the plane parallel end surfaces such as shown in FIGS. 2 through 6, arched end surfaces 72 and 92, of which the surface 72 is convex toward the object and the surface 92 is concave toward the eye. These surfaces are formed, respectively, on members 73 and 93 which are concavo-convex, and which has facing surfaces 71 and 91 cemented together at an interface. On one of these surfaces, frame 11 is deposited by vaporizing. These glass disks or cups 73 and 93 are made of blown or curved glasses. The curvature and thickness of these disks is selected in such a manner that no undesired refractive power occurs. It would be possible to use only one of these lenses 73 and 93, preferably lens 93 toward the eye. However, the additional use of the other lens 73 has the advantage that the frame 11 is protected.

It will be understood from the above that this invention is not limited to the specific materials, constructions, parts, members, and other details specifically described above and/or shown in the drawings, and can be carried out with various modifications without departing from the scope of the invention as defined in the appended claims.

It is, of course, possible to reverse the arrangement described in FIG. 4. This reversed arrangement, though not shown in the drawings, can be deduced from FIG. 4 if one imagines that the elements 60, 61, 62, 63 and 66 will displace the front lens 1 or the glass block 5, or both these elements at the same time and that the elements 81 and 82 comprising the frame 11 will not be displaced.

"To deposit by vaporising" in respect of the frame means that an element, e.g. aluminum, gold, etc. is vaporised under vacuum and that this vapor coats the surface of the carrier to be treated as far as it is not covered by templets which keep that zone of the surface uncoated where the corresponding frame has to be applied.

What is claimed is:

1. An Albada viewfinder of the block type designed for mounting within a camera, and comprising, in combination, a partially permeable, spherical concave mirror through which the operator observes the object to be viewed, and constituting the only entry, into the viewfinder, of light rays, said mirror being convex in the direction of the object and being disposed at a first interface between registering curved surfaces of a pair of transparent blocks, the registering curved surfaces having substantially equal radii of curvature and the blocks having substantially equal indices of refraction, so that said mirror has a light refractive power of substantially zero; a picture limiting frame located in substantially the focal plane of said mirror whereby said mirror will form an image of said frame at substantially infinity; said frame being arranged on a smooth, uninterrupted second interface formed by registering curved surfaces of a pair of transparent blocks, said second interface being convex in the direction of the object to be viewed, and the surface of the frame facing said mirror conforming to the curvature of said second interface; said frame having a size such that it is positioned entirely within the solid angle defined by light rays passing through or reflected by the periphery of said mirror, and being substantially smaller than the eye opening of the viewfinder; the radius of curvature of said second interface being not in excess of one-half of the radius of curvature of said mirror; whereby all light rays illuminating any part of the frame reach such frame part from that area of the image field into which the respective frame part is reflected for viewing by the eye of an observer looking into the viewfinder along the optical axis thereof, and all light rays incident upon the frame and reflected by said mirror to the thus located eye of an observer being included within said solid angle.

2. An Albada viewfinder as claimed in claim 1 in which one of the transparent blocks forming said second interface constitutes an eye-piece lens, the blocks forming said second interface being cemented to each other at their registering curved surfaces to form a frame carrier and the frame being arranged in the cemented interface, the frame carrier being separated from the transparent blocks forming said first interface.

3. An Albada viewfinder as claimed in claim 2 including a reflecting scale deposited on the first surface of the frame-carrying interface as considered in the direction of light entering the viewfinder.

4. An Albada viewfinder as claimed in claim 3, in which said first surface forming said second interface is formed with a recess; and a non-displaceable mark, which is stationary relative to the viewfinder casing, projecting into said recess.

5. An Albada viewfinder as claimed in claim 1, in which the registering curved surfaces forming said second interface are cemented to each other to form an individual eye-piece lens; the second surface forming said second interface, considered in the direction of light rays entering the viewfinder, being provided with reflection reducing means.

6. An Albada viewfinder as claimed in claim 1, in which the pair of transparent blocks forming said second interface constitute a frame carrier which is arranged for displacement in a direction perpendicular to the optical axis of the viewfinder to compensate for parallax.

7. An Albada viewfinder as claimed in claim 6, including means coupling displacement for parallax with displacement of the picture-taking objective.

8. An Albada viewfinder as claimed in claim 6, in combination with a base range finder forming a unit with the viewfinder; and means coupling displacement for parallax with adjustment of said range finder.

9. An Albada viewfinder as claimed in claim 8, including a scale for parallax compensation and a scale for distance indication, said scales being arranged to permit simultaneous readings of the respective values.

10. An Albada viewfinder as claimed in claim 1, in which the first one of the pair of blocks forming said first interface, considered in the direction of light entering the viewfinder, is a light entry lens, and is displaceable to adjust for parallax compensation.

11. An Albada viewfinder as claimed in claim 1, in which the second of said pair of transparent blocks forming said first interface, considered in the direction of light entering the viewfinder, is displaceable for parallax compensation.

12. An Albada viewfinder as claimed in claim 1, including a frame carrier comprising plural frames of varying sizes, corresponding to different image angles, each of said frames being adapted to be brought into the solid angle of light rays through the viewfinder, by relative displacement of said frame carrier.

13. An Albada viewfinder as claimed in claim 1, in which the pair of transparent blocks having registering curved surfaces forming said second interface constitute a frame carrier in the form of a convex glass cup.

14. An Albada viewfinder as claimed in claim 13, in which the frame is carried by two convex glass cups cemented to each other at said second interface, with the frame being embedded in the cemented second interface.

15. An Albada viewfinder as claimed in claim 1, including a reflecting mark in said second interface and on the optical axis of the viewfinder, for indicating the center of the viewfinder image.

16. An Albada viewfinder as claimed in claim 1, in which, considered in the direction of light rays entering the viewfinder, the light ray exit surface of the second block forming the first interface and the light ray entry surface of the first block forming the second interface face each other and are plane surfaces which are perpendicular to the optical axis of the viewfinder.

17. An Albada viewfinder of the block type designed for mounting within a photographic camera and comprising, in combination, a front lens facing the object and having a spherically-concave inner surface, said lens constituting the only entry for light into the viewfinder; a partially permeable, spherically-concave mirror on said inner surface of said front lens; block form optical means of transparent material having a spherically convex outer surface registering with said inner surface of said lens and connected thereto by cement; said front lens and said optical means having substantially equal indices of refraction so that said mirror has a light refractive power of substantially zero; an eye piece lens having a smooth, uninterrupted, spherically convex outer surface adjacent the inner surface of said block form optical means and connected thereto by cement; a picture limiting frame on said outer surface of said eye piece lens, and disposed in substantially the focal plane of said mirror whereby said mirror will form an image of said frame at substantially infinity; the convex surface portion on which said frame is arranged being disposed completely within the solid angle formed by light rays passing through or reflected by the periphery of said mirror, and the surface of the frame facing said mirror conforming to the curvature of said convex surface portion; said frame being substantially smaller than the eye opening of the finder; the convex surface on which said frame is arranged having a radius of curvature not in excess of one-half of the radius of curvature of said mirror; whereby all light rays illuminating any part of the frame reach such frame part from that area of the image field into which the respective frame is reflected for viewing by the eye of an observer looking into the viewfinder along the optical axis thereof through said eye piece lens, all light rays incident upon the frame and reflected by said mirror to the thus located eye of an observer being included within said solid angle.

18. An Albada view-finder as claimed in claim 17, in which said block form optical means and said eyepiece lens have substantially equal indices of refraction so that the interface therebetween has a refractive power of zero.

References Cited in the file of this patent

UNITED STATES PATENTS

| | | |
|---|---|---|
| 849,504 | Schanz | Apr. 9, 1907 |
| 1,985,067 | Wandersleb | Dec. 18, 1934 |
| 2,178,344 | Leitz et al. | Oct. 31, 1939 |
| 2,187,057 | Sauer | Jan. 16, 1940 |
| 2,187,246 | Nerwin | Jan. 16, 1940 |
| 2,217,930 | Zimmerman | Oct. 15, 1940 |
| 2,896,500 | Kakunodate | July 28, 1959 |

FOREIGN PATENTS

| | | |
|---|---|---|
| 558,417 | Germany | Sept. 7, 1932 |
| 996,990 | France | Sept. 5, 1951 |
| 1,025,524 | France | Jan. 21, 1953 |

OTHER REFERENCES

"Photo Technik and Wirtschaft," No. 5, 1956, pages 204 and 205 cited.